(12) United States Patent
Wang et al.

(10) Patent No.: US 10,129,844 B2
(45) Date of Patent: Nov. 13, 2018

(54) TIMING SYNCHRONIZATION FOR SMALL CELLS WITH LIMITED BACKHAUL

(71) Applicant: Google Inc., Mountain View, CA (US)

(72) Inventors: Jibing Wang, San Jose, CA (US); James Peroulas, San Mateo, CA (US)

(73) Assignee: Google LLC, Mountain View, CA (US)

( * ) Notice: Subject to any disclaimer, the term of this patent is extended or adjusted under 35 U.S.C. 154(b) by 91 days.

(21) Appl. No.: 15/333,752

(22) Filed: Oct. 25, 2016

(65) Prior Publication Data

US 2017/0127368 A1 May 4, 2017

Related U.S. Application Data

(60) Provisional application No. 62/248,678, filed on Oct. 30, 2015.

(51) Int. Cl.
| | |
|---|---|
| *H04W 56/00* | (2009.01) |
| *H04L 7/00* | (2006.01) |
| *G01S 19/14* | (2010.01) |
| *H04W 84/04* | (2009.01) |

(52) U.S. Cl.
CPC ........ *H04W 56/0015* (2013.01); *G01S 19/14* (2013.01); *H04L 7/0087* (2013.01); *H04W 84/042* (2013.01)

(58) Field of Classification Search
CPC ............ H04W 56/0015; H04W 84/042; H04L 7/0087; G01S 19/14
See application file for complete search history.

(56) References Cited

U.S. PATENT DOCUMENTS

| | | | |
|---|---|---|---|
| 8,611,333 | B2 | 12/2013 | Ji et al. |
| 9,049,706 | B2 | 6/2015 | Zhang et al. |
| 9,408,167 | B2 | 8/2016 | Zhu et al. |
| 2009/0196277 | A1 | 8/2009 | Horn et al. |
| 2011/0051754 | A1 | 3/2011 | Lansdowne |
| 2012/0250704 | A1 | 10/2012 | Yamada et al. |

(Continued)

FOREIGN PATENT DOCUMENTS

KR   100895175 B1   5/2009

OTHER PUBLICATIONS

International Search Report and Written Opinion for PCT Application No. PCT/US2016/058677 dated Jan. 26, 2017.

*Primary Examiner* — Ian N Moore
*Assistant Examiner* — Justin T Van Roie
(74) *Attorney, Agent, or Firm* — Honigman Miller Schwartz and Cohn LLP

(57) ABSTRACT

A telecommunication system includes base stations, a backhaul network transmitters, a backhaul network in communication with the base stations, and a synchronizing system in communication with the base stations. The base stations are configured to transmit/receive signals to/from user equipment and the backhaul network is configured to convey information to and from at least one of the base stations. The synchronizing system is configured to synchronize a communication timing between the base stations over a synchronizing network. The synchronizing network is separate from the backhaul network and is configured to provide the communication timing between the synchronizing system and a corresponding synchronization port at each of the base stations.

25 Claims, 8 Drawing Sheets

(56) References Cited

U.S. PATENT DOCUMENTS

2013/0132502 A1\* 5/2013 Stacey .............. H04W 56/0015
  709/208
2014/0226984 A1 8/2014 Roberts et al.
2015/0257024 A1 9/2015 Baid et al.

\* cited by examiner

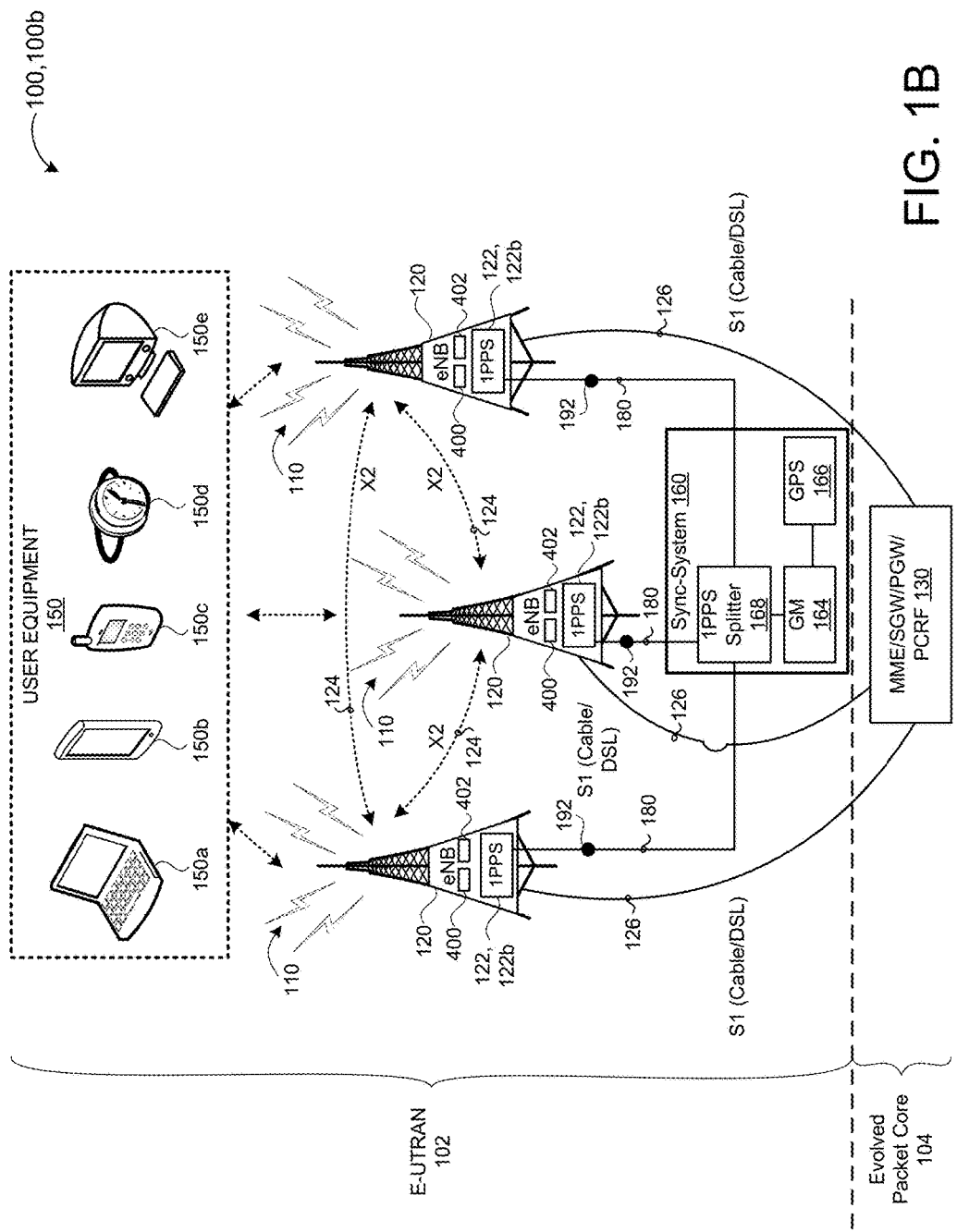

TIMING SYNCHRONIZATION FOR SMALL CELLS WITH LIMITED BACKHAUL

CROSS REFERENCE TO RELATED APPLICATIONS

This U.S. patent application claims priority under 35 U.S.C. § 119(e) to U.S. Provisional Application 62/248,678, filed Oct. 30, 2015, which is hereby incorporated by reference in its entirety.

TECHNICAL FIELD

This disclosure relates to timing synchronization for small cells with limited backhaul.

BACKGROUND

Telecommunication is when two or more entities or units exchange information (i.e., communicate) using technology. Channels are used to transmit the information either over a physical medium (e.g., signal cables), or in the form of electromagnetic waves, or a combination of the two. A communication network includes transmitters, receivers, and communication channels that transmit the messages from the transmitters to the receivers. Digital communications networks may also include routers that route a message to the correct receiver (e.g., user). Analog communications networks may also include switches that form a connection between two users. In addition, both the digital and analog communications networks may include repeaters used to amplify or recreate the signal transmitted over long distance. The repeaters are used to counteract the attenuation that the signal experiences as it is being transmitted.

SUMMARY

One aspect of the disclosure provides a telecommunication system including base stations, a backhaul network, and a synchronizing system. The base stations are configured to transmit/receive signals to/from user equipment. The backhaul network is in communication with the base stations and is configured to convey information to and from at least one of the base stations. The synchronizing system is in communication with the base stations and is configured to synchronize a communication timing between the base stations over a synchronizing network. The synchronizing network is separate from the backhaul network and is configured to provide the communication timing between the synchronizing system and a corresponding synchronization port at each of the base stations.

Implementations of the disclosure may include one or more of the following optional features. In some implementations, the synchronizing system includes a global positioning system, a grandmaster clock, and a network switch. The grandmaster clock may be in communication with the global positioning system and may be configured to receive a current time from the global positioning system. The network switch may be in communication with the grandmaster clock and the transmitters. The network switch may be configured to receive the communication timing from the grandmaster clock and transmit the communication timing to the base stations over the synchronizing network. The synchronization port at each base station may include an Ethernet port configured to receive a precision time protocol (PTP) signal from the network switch. The network switch may be configure to transmit a PTP signal to the base stations over the synchronizing network. The PTP signal may include the communication timing.

In some examples, the synchronizing system includes a global positioning system, a grandmaster clock and a pulse-per-second splitter. The grandmaster clock may be in communication with the global positioning system and may be configured to receive a current time from the global positioning system. The pulse-per-second splitter may be in communication timing from the grandmaster clock and transmit the communication timing to the base stations over the synchronizing network. The synchronization port at each base station may include a pulse-per-second port configured to receive a pulse-per-second signal from the pulse-per-second splitter. The pulse-per-second splitter may be configured to transmit a pulse-per-second signal to the base stations. The pulse-per-second signal may include the communication timing. The synchronizing system may also include a network switch in communication with the base stations. The network switch may be configured to receive the communication timing from one of the base stations comprising a grandmaster base station and transmit the communication timing to the base stations other than the grandmaster base station.

The synchronization port at each base station may include an Ethernet port configured to receive a PTP signal from the network switch or transmit the PTP signal to the network switch. In some examples, the network switch is configured to receive a PTP signal from the grandmaster base station and transmit the PTP signal to the base stations other than the grandmaster base station. The PTP signal may include the communication timing. The synchronizing system may include a pulse-per-second splitter in communication with the synchronization ports at each of the base stations. The pulse-per-second splitter may be configured to receive the communication timing from one of the base stations comprising a grandmaster base station and transmit the communication timing to the base stations other than the grandmaster base stations. The synchronization port at each base station may include a pulse-per-second port configured to receive a pulse-per-second signal from the pulse-per-second splitter or transmit the pulse-per-second signal to the pulse-per-second splitter. In some examples, the pulse-per-second splitter is configured to receive a pulse-per-second signal from the grandmaster base station, the pulse-per-second signal comprising the communication timing and transmit the pulse-per-second signal to the base stations other than the grandmaster base station.

Another aspect of the disclosure provides a method for synchronizing a communication timing between base stations over a synchronizing network. The method includes receiving, at a first base station, information over a backhaul network and transmitting communication signals from the first base station to user equipment over an air interface. The first base station may include one of multiple base stations in a telecommunication network. The method also includes receiving, at the first base station, a communication timing from a synchronizing system over a synchronizing network. The synchronizing system is in communication with the base stations and configured to synchronize the communication timing between the base stations over the synchronizing network. The synchronizing network is separate from the backhaul network and is configured to provide the communication timing between the synchronizing system and a corresponding synchronization port at each of the base stations.

Implementations of the disclosure may include one or more of the following optional features. In some implementations, the synchronization system includes a global positioning system, a grandmaster clock, and a network switch. The grandmaster clock is in communication with the global positioning system and configured to receive a current time from the global positioning system. The network switch is in communication with the grandmaster clock and with the first base station. The network switch is configured to receive the communication timing from the grandmaster clock and transmit the communication timing to the first base station over the synchronizing network. The synchronization port at the first base station may include an Ethernet port configured to receive a PTP signal from the network switch. The PTP signal may include the communication timing. Thus, the receiving the communication timing from the synchronizing system may include receiving the PTP signal from the network switch at the Ethernet port of the first base station.

In some examples, the synchronizing system includes a global positioning system, a grandmaster clock, and a pulse-per-second splitter. The grandmaster clock may be in communication with the global positioning system and configured to receive a current time from the global positioning system. The pulse-per-second splitter may be in communication with the grandmaster clock and the transmitters. The pulse-per-second splitter may be configured to receive the communication timing from the grandmaster clock and transmit the communication timing to the base stations over the synchronizing network. The synchronization port at each base station may include a pulse-per-second port configured to receive a pulse-per-second signal from the pulse-per-second splitter. The pulse-per-second signal may include the communication timing. Thus, the receiving the communication timing from the synchronizing system may include receiving the pulse-per-second signal from the pulse-per-second splitter at the pulse-per-second port of the first base station.

When a second base station initially wakes up, the method may include determining, by control hardware of the second base station, whether any of the other base stations in the communication network are identified as a first grandmaster base station within a predetermined period of time. The method may also include, when one of the other base stations is identified as the first grandmaster base station within the predetermined period of time, designating, by the control hardware, the second base station as a slave base station and receiving, at the synchronization port of the second base station, the communication timing from the synchronizing system over the synchronizing network. When the control hardware fails to identify one of the other base stations as the first grandmaster base station within the predetermined period of time, designating, by the control hardware, the second base station as the first grandmaster base station and transmitting the communication timing from the synchronization port at the second base station to the synchronizing system over the synchronizing network.

Determining whether any of the other base stations in the communication network are identified as the first grandmaster base station may include determining one of the other base stations is identified as the first grandmaster base station when the synchronization port at the second base station receives a PTP signal from a network switch over the synchronizing network. The PTP signal may include the communication timing. In some examples, the network switch is configured to receive the PTP signal from the other base station comprising the first grandmaster base station and transmit the PTP signal to the second base station.

The method may also include, after transmitting the communication timing from the synchronization port at the second base station, determining, by the control hardware of the second base station, whether any of the other base stations in the communication network are identified as a second grandmaster base station. When one of the other base stations is identified as the second grandmaster base station, the method may include ceasing, by the control hardware, transmission of the communication timing from the synchronization port at the second base station to the synchronizing system and determining, by the control hardware, whether the synchronization port at the second base station receives a PTP signal from a network switch over the synchronizing network. When the synchronization port at the second base station receives the PTP signal from the network switch, the method may include designating, by the control hardware, the second base station as the slave base station.

In some examples, when the synchronization port at the second base station fails to receive the PTP signal from the network switch, the method includes maintaining, by the control hardware, the designation of the second base station as the first grandmaster base station and transmitting the PTP signal from the synchronization port at the second base station to the network switch over the synchronizing network. The PTP signal may include the communication timing. Determining whether any of the other base stations in the communication network are identified as the first grandmaster base station may include determining one of the other base stations is identified as the first grandmaster base station when the synchronization port at the second base station receives a pulse-per-second signal from a pulse-per-second splitter over the synchronizing network. The pulse-per-second signal may include the communication timing. In some examples, the pulse-per-second splitter is configured to receive the pulse-per-second signal from the other base station comprising the first grandmaster base station and transmit the pulse-per-second signal to the second base station.

After transmitting the communication timing from the synchronization port at the second base station, the method may include determining, by the control hardware of the second base station, whether any of the other base stations in the communication network are identified as a second grandmaster base station. When one of the other base stations is identified as the second grandmaster base station, the method may include resolving, by the control hardware, with the other base station identified as the second grandmaster base station over a backhaul link whether one of: the second base station will remain the first grandmaster base station and the other base station will transition to become a slave base station; or the second base station will transition to become the slave base station and the other base station will remain the second grandmaster base station. The resolving with the other base station may be based on crystal oscillator (XO) stability at each of the base stations. The resolving with the other base station may also be based on global positioning system (GPS) signal availability at each of the base stations. Determining whether any of the other base stations in the communication network are identified as the second grandmaster base station may include detecting, by the control hardware, a double-length identification sequence transmitted from the other base station to the synchronizing system over the synchronizing network.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 1A-1D are schematic views of exemplary telecommunication networks including a sync-system that communicates with evolved Node B's (eNBs) over synchronization network separate from a backhaul link.

Like reference symbols in the various drawings indicate like elements.

DETAILED DESCRIPTION

Figure 1A:
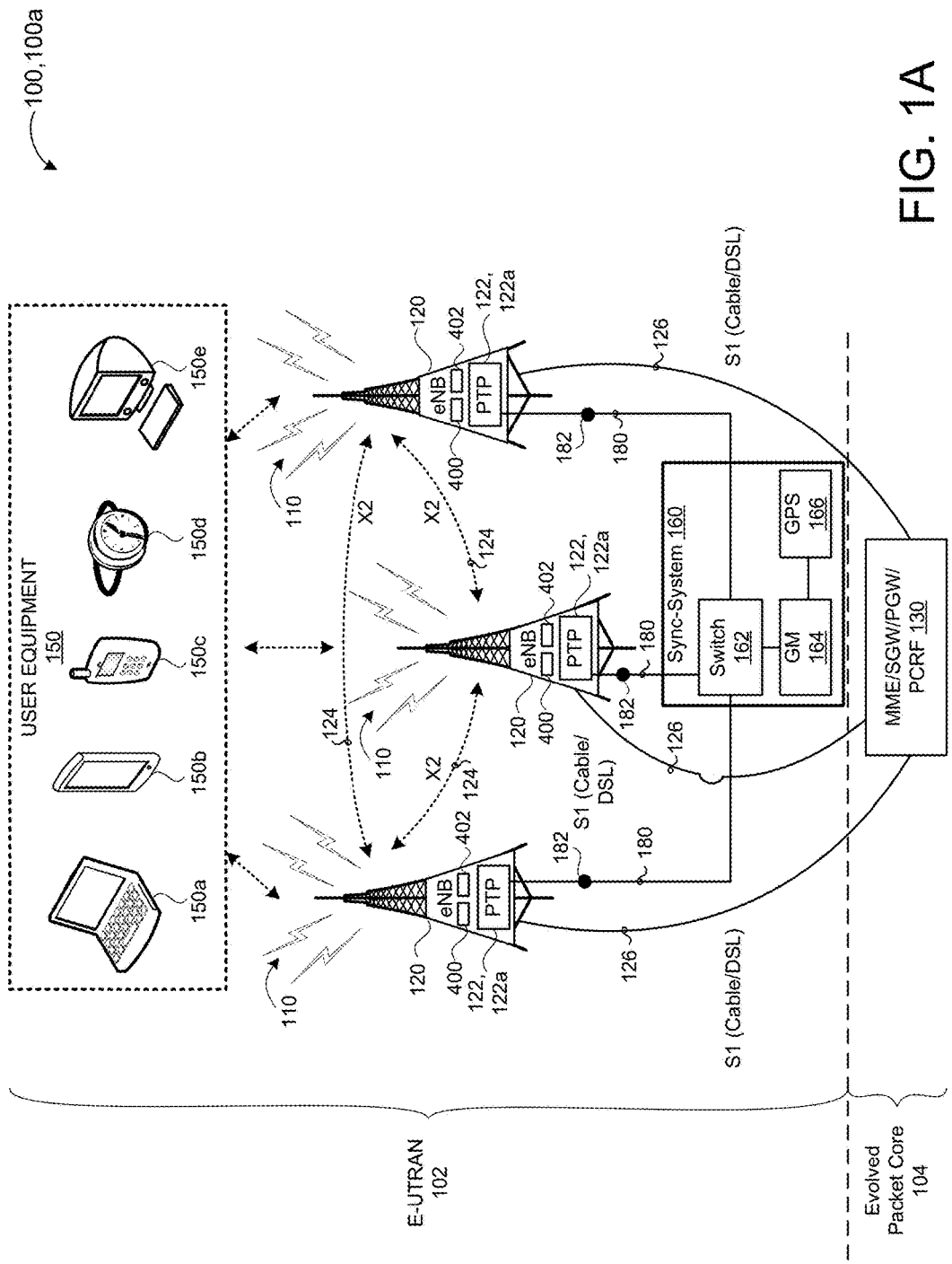

Long-Term Evolution (LTE) is a standard for wireless communication of high-speed data for mobile phones and data terminals. LTE is based on the Global System for Mobile Communications/Enhanced Data Rates for GSM Evolution (GSM/EDGE) and Universal Mobile Telecommunication System/High Speed Packet Access (UMTS/HSPA) network technologies. LTE is configured to increase the capacity and speed of the telecommunication by using different ratio interfaces in addition to core network improvements. LTE supports scalable carrier bandwidths, from 1.4 MHz to 20 MHz and supports both frequency division duplexing (FDD) and time-division duplexing (TDD).

FIGS. 1A-1D show a portion of a Long-Term Evolution Time-Division Duplex (LTE-TDD) network 100, 100a-d. The LTE-TDD network 100 may also be referred to as Time-Division Long-Term Evolution (TD-LTE), and is a 4G telecommunication technology and standard co-developed by an international coalition of companies. LTE-TDD networks 100 were developed with the intention of migrating to 4G from the third generation 3D Time Division Synchronous Code Division Multiple Access (TD-SCDMA) networks. The LTE-TDD network 100 uses a single frequency for uploading and downloading information. Therefore, the upload and download times alternate. In some examples, the ratio of uploads versus downloads change dynamically, based on the amount of data being uploaded versus the amount of data being downloaded. LTE-TDD networks 100 operate at frequencies ranging from 1850 MHz to 3800 MHz, with several different bands being used.

As shown in the figures, the LTE-TDD network 100 includes a first portion, an Evolved Universal Terrestrial Radio Access Network (e-UTRAN) portion 102, and a second portion, an Evolved Packet Core (EPC) portion 104. The first portion 102 includes an air interface 110 (i.e., Evolved Universal Terrestrial Radio Access (e-UTRA)) of $3^{Rd}$ Generation Partnership Project's (3GPP's) LTE upgrade path for mobile networks, user equipment (UE) 150, and multiple base stations 120 (also known as small cells). The LTE air interface 110 uses orthogonal frequency-division multiple access (OFDMA) radio-access for the downlink and Single-carrier FDMA (SC-FDMA) for the uplink.

The EPC 104 is a framework for providing converged voice and data on the LTE-TDD network 100. The EPC 104 unifies voice and data on an Internet Protocol (IP) service architecture and voice is treated as just another IP application. The EPC 104 includes several key components 130 that include, without limitation, a Mobility Management Entity (MME), a Serving Gateway (SGW), a Packet Data Node Gateway (PGW), and a Policy and Charging Rules Function (PCRF).

The MME is a key control-code for the LTE network 100. The MME manages session and states and authenticates and tracks a UE 150 across the network 100. The SGW is responsible for routing packets through the network 100. The PGW is an interface between the LTE-TDD network 100 and other packet data networks, manages quality of service (QoS), and provides deep packet inspection (DPI). The PCRF supports service data flow detection, policy enforcement, and flow-based charging.

Each base station 120 may include an evolved Node B (also referred as eNode B or eNB). An eNB 120 hardware that connects to the mobile phone network (i.e., the air interface 110) and communicates directly with the UEs 150. The eNB 120 does not have a separate controller element and, thus, simplifies the architecture of the network 100. The eNB 120 uses the E-UTRA protocols OFDMA (downlink) and SC-FDMA (uplink). In addition, the eNB 120 embeds its own control functionality, since the eNB 120 does not include a separate controller element. The eNB 120 uses multiple protocols when interfacing with different elements. For example, the eNB 120 uses an X2-interface 124 when communicating with other eNBs 120 in the network 100 and uses an S1 interface 126 for communicating with the EPC 104. The S1 interface 126 may include an S1-MME interface for communicating with the MME and an S1-U interface for interfacing with the SGW. Accordingly, the S1 interface 126 is associated with a backhaul link for communicating with the EPC 104.

Each eNB 120 may include control hardware 400 and memory hardware 402. The memory hardware 402 stores information, such as instructions executable by the control hardware 400, non-transitorily at the control hardware 400. The memory hardware 402 may be a computer-readable medium, a volatile memory unit(s), or non-volatile memory unit(s). The memory hardware 402 may be physical devices used to store programs (e.g., sequences of instructions) or data (e.g., program state information) on a temporary or permanent basis for use by the control hardware 800. Examples of non-volatile memory include, but are not limited to, flash memory and read-only memory (ROM)/ programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes. The control hardware 400 can be, for example, a processor executing computer-readable instructions stored in the memory hardware 402, a field programmable gate array (FGPA), a digital signal processor (DSP), or any other suitable circuitry.

UEs 150 may be any telecommunication device that is capable of transmitting and/or receiving voice/data over the network 100. UEs 150 may include, but are not limited to, mobile computing devices, such as laptops 150a, tablets 150b, smart phones 150c, and wearable computing devices 150d (e.g., headsets and/or watches). UEs 150 may also include other computing devices having other form factors, such as computing devices included in desktop computers 150e, vehicles, gaming devices, televisions, or other appliances (e.g., networked home automation devices and home appliances).

Neighboring eNBs 120 within the network 100 may provide overlapping coverage areas. For example, the 3$^{Rd}$ Generation Partnership Project (3GPP), which is a standardization that includes LTE and related "4G" standards, among others, requires a three microsecond frame synchronization tolerance between any two neighboring eNBs 120. It may be difficult to achieve these synchronization requirements when the eNB 120 is positioned indoors without access to a global positioning system (GPS), such as with legacy backhaul cables (e.g., DSL/cable 126) connecting to the EPC 104. Traditionally, each eNB 120 includes a GPS receiver to ensure synchronization between neighboring eNBs 120. In this case, synchronization between neighboring eNBs 120 works well only when the eNB 120 is capable of receiving a GPS signal. Another method of synchronizing neighboring eNBs 120 is via the Precision Time Protocol (PTP) as indicated by the IEEE 1588 standard. PTP is the protocol used to synchronize clocks through a computer network, and provides accuracy in the range of the sub-microsecond. This method allows the eNBs 120 to receive synchronization packets via the backhaul link 126 (e.g., X1 interface) from the EPC 104. However, transmitting synchronization packets via the traditional backhaul link 126 often results in delay variations in the synchronization packets, lost packets, and asymmetric Transmission Control Protocol (TCP) load. These occurrences make it challenging to maintain good timing performance. Therefore, it is desirable to design a network 100, 100a-d that provides accurate synchronization between the neighboring eNBs 120 without having to transmit synchronization packets via the traditional backhaul link 126.

In some implementations, the network 100 includes a sync-system 160 that provides the eNBs 120 with a separate synchronization port 122, 122a-b not shared by either one of the X2 interface 124 or the S1 interface 126. Therefore, the synchronization ports 122 of the neighboring eNBs 120 provide a separate synchronization network 180 between the sync-system 160 and the eNBs 120 that is different from both the X2 interface 124 and the S1 interface 126. In some examples, the sync-system 160 is used when the backhaul (e.g., S1 interface 126) is unable to meet the synchronization requirements. The separate port 122 associated with the eNBs 120 of FIGS. 1A and 1C may include an Ethernet port 122a for receiving PTP packets 182 from the sync-system 160. The separate port 122 associated with the eNBs 120 of FIGS. 1B and 1D may include a pulse per second (PPS) connector port 122b for receiving PPS signals 192 from the sync-system 160.

Referring to FIG. 1A, in some implementations, the sync-system 160 includes a network switch 162, a grandmaster clock (GM) 164, and a GPS 166. The GM 164 provides the root timing of the network 100 by transmitting synchronized information to the clocks located at the eNBs 120. For instance, the GM 164 provides the master clock, while the eNBs 120 operate as slaves. The GPS 166 communicates with the GM 164 to provide the time to the GM 164. The GM 164 transmits PTP messages (i.e., PTP packets 182) to the eNBs 120. In addition, each PTP message 182 may include a timestamp, which is corrected to adjust for time spent traversing the network equipment (e.g., the sync-system interface 180). The network switch 162 allows the PTP message 182 to transmit from the GM 164 to an Ethernet port 122a of each eNB 120. The network switch 162 is configured to forward the PTP packets 182 to one or more eNBs 120 that require synchronization, rather than broadcasting the data out of every port.

Referring to FIG. 1B, in some implementations, the sync-system 160 includes a 1PPS splitter 308 instead of the switch 302 used by the sync-system 160 of FIG. 1A. Moreover, the port 122b associated with the eNBs may be a 1PPS (also known as PPS) connector 122b for transmitting/receiving PPS signals 192 to/from the sync-system 160. A PPS signal 192 is an electrical signal having a width that is less than one second and a sharply rising or abruptly falling edge that accurately repeats once per second. PPS signals 192 are used to measure time and precisely keep time. Since the PPS signal 192 does not specify the actual time, but only specifies the start of a second, the sync-system 160 combines the time from the GPS 166 with the PPS signal 192 to determine a synchronized time. The PPS splitter 168 is configured to transmit the PPS time stamps to the various eNBs 120 at the same time. The splitter 168 receives the 1PPS signal from the GM 164, which is in turn connected to the GPS 166. In some examples, the GPS 166 outputs the 1PPS signal to the GM 164. In this case, the propagation delay between the GM 164 and the eNBs 120 is calibrated based on several factors including distance between the Sync-System 160 and the eNBs 120.

Figure 1C:
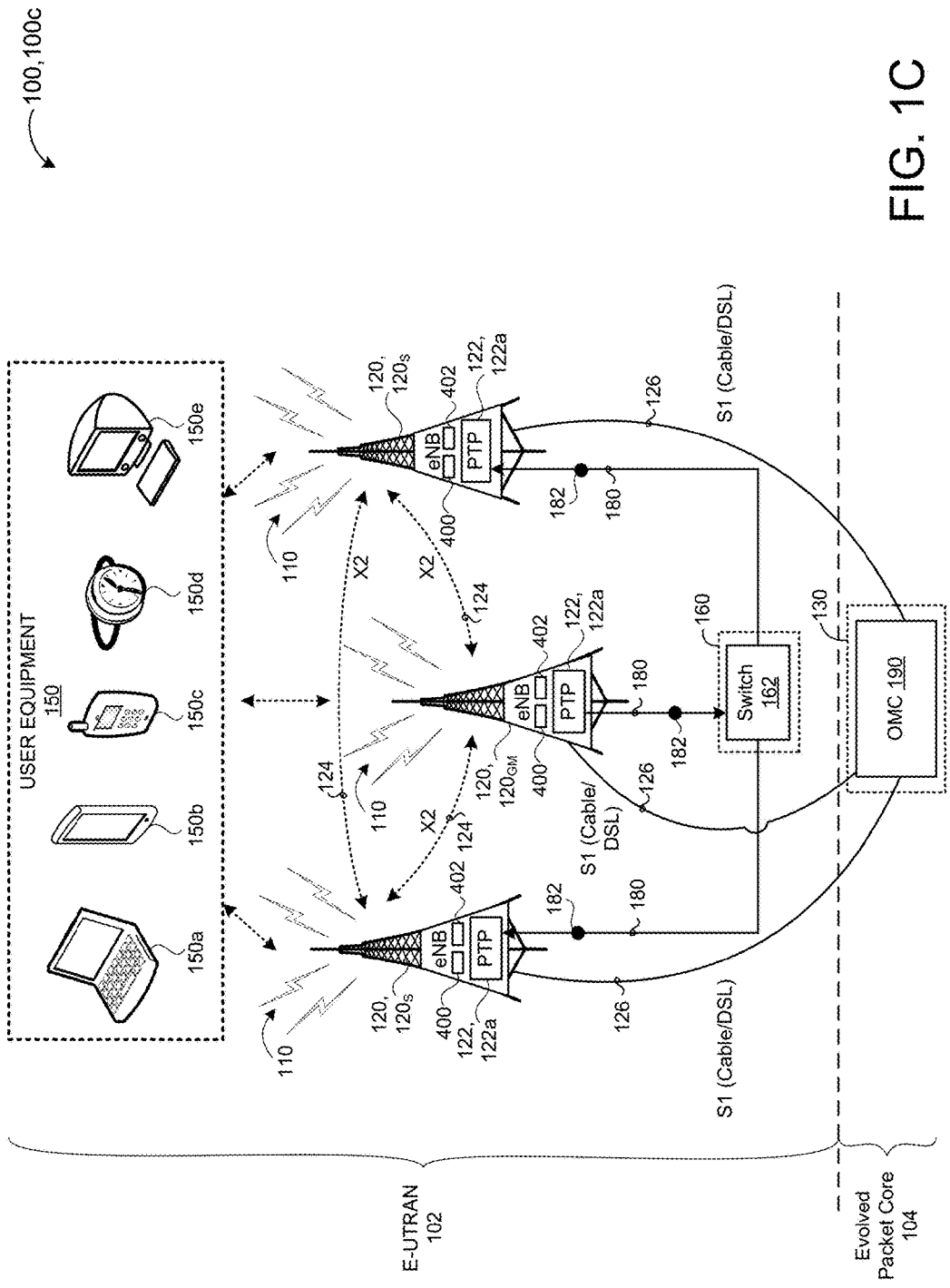
Figure 1D:
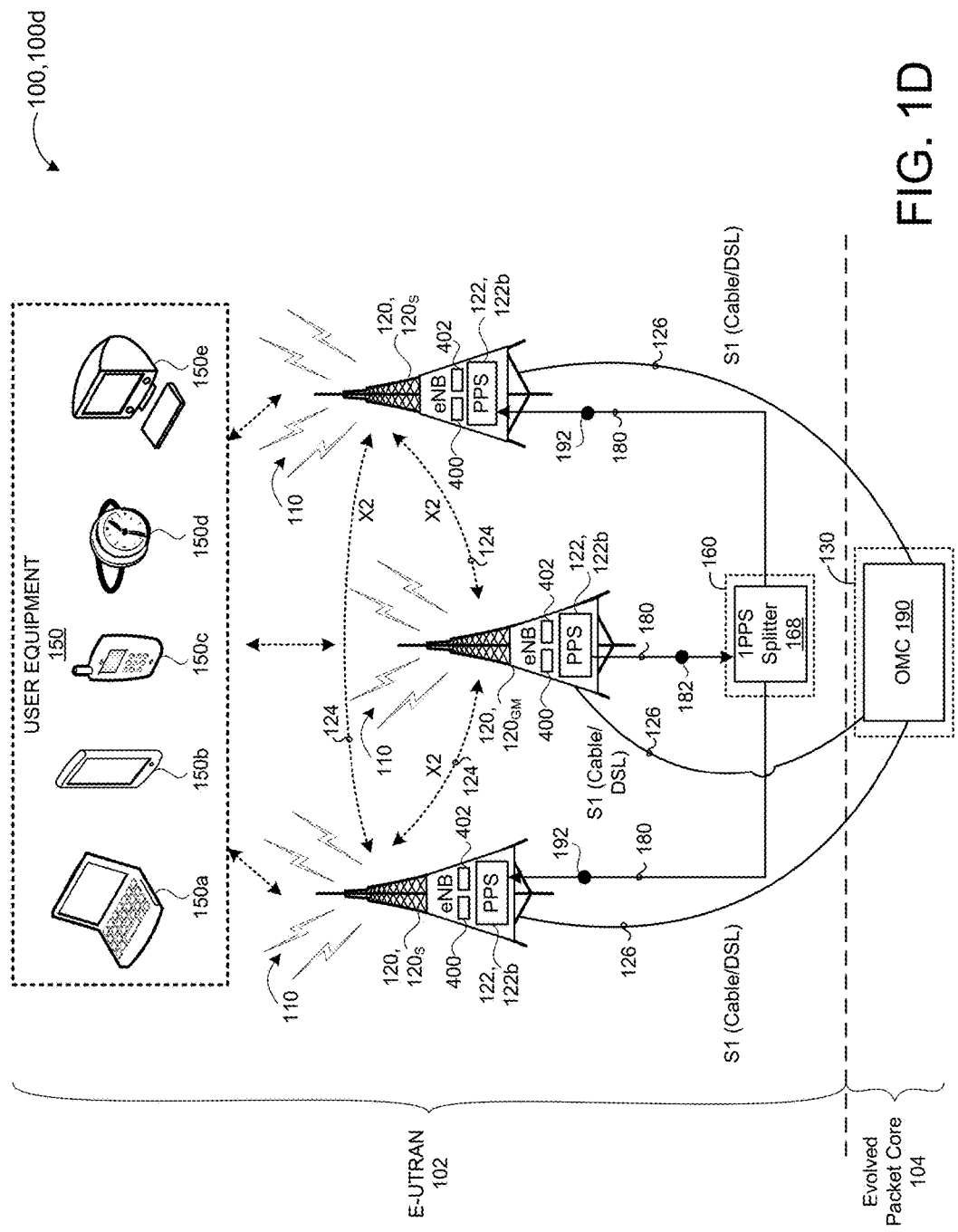

Referring to FIGS. 1C and 1D, in some implementations, the sync-system 160 does not include the GM 164 described above in FIGS. 1A and 1B. Instead, the sync-system 160 relies on one eNB 120 to act as a grandmaster eNB $120_{GM}$ to provide timing reference for a group of neighboring slave eNBs $120_S$. The EPC 104 may include an operations and maintenance center (OMC) 190 that selects the grandmaster eNB $120_{GM}$ to act as the grandmaster clock. The OMC 190 may select the grandmaster eNB $120_{GM}$ based on one or more factors, such as, but not limited to, eNB capability, crystal oscillator (XO) stability, and GPS signal availability at the eNBs 120. For example, the eNB 120 with the best XO stability may be chosen as the grandmaster eNB $120_{GM}$. In some examples, a Network Time Protocol (NTP), which is a network protocol for clock synchronization between computer systems over packet-switched, variable-latency data networks, is enabled over the backhaul (e.g., S1 Interface 126) between the EPC 104 and the grandmaster eNB $120_{GM}$ to maintain frequency stability.

Referring to FIG. 1C, the grandmaster eNB $120_{GM}$ produces the PTP packets 182 for transmission from the Ethernet port 122a of the eNB $120_{GM}$ to the network switch 162 of the sync-system 160, which in turn transmits the PTP packets 182 to the slave eNBs $120_S$. Referring to FIG. 1D, in this configuration, each eNB 120 includes a PPS connector 122b. Therefore, the grandmaster eNB $120_{GM}$ produces the PPS signal 192 and outputs it from the corresponding PPS connector 122b to the PPS splitter 308 at the sync-system 160, which in turn sends the PPS signal 192 to the slave eNBs $120_S$.

Figure 2A:
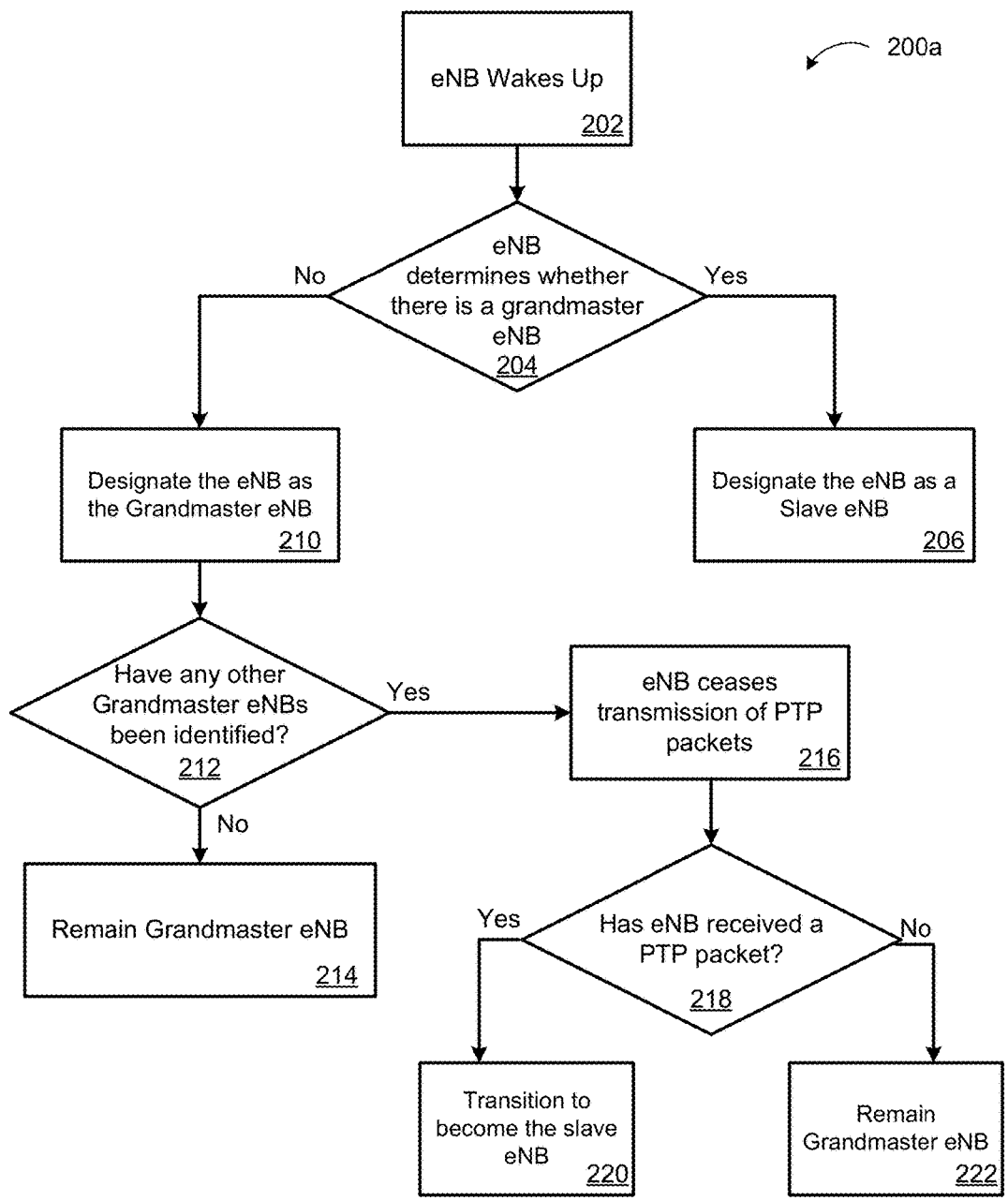
FIG. 2A is a flowchart of an example method for determining a grandmaster eNB from multiple eNBs of the network of FIG. 1C.

In some implementations, the eNBs 120 autonomously select a grandmaster eNB $120_{GM}$ among multiple neighboring eNBs 120 based on a set of rules/algorithms. FIG. 2A is a flowchart of an example 200a for determining a grandmaster eNB 120 from multiple eNBs 120 each having a synchronization port 122 configured to transmit/receive PTP packets 182 from the network switch 162 of the sync-system 160 of FIG. 1C. An eNB 120 wakes up at operation 202, and within a predetermined period of time, the control hardware 400 determines, at operation 204, whether any of the neighboring eNBs 120 in the network 100c are identified as the grandmaster eNB $120_{GM}$. The control hardware 400 may identify another eNBs 120 as the grandmaster eNB $120_{GM}$ when the synchronization port 122 (e.g., Ethernet port) at the corresponding eNB 120 receives a PTP packet 182 from the network switch 162 of the sync-stem 160 over the synchronizing network 180. When the control hardware 400 at the corresponding eNB 120 determines there is a grandmaster eNB $120_{GM}$ in the network 100c within the predetermined period of time (i.e., operation 204 is "Yes"), then the control hardware 400 designates the corresponding eNB 120 as one of the slave eNBs $120_S$ at operation 206. Here, the designated grandmaster eNB $120_{GM}$ provides PTP packets 182 to the slave eNBs $120_S$ via the network switch 162 of the sync-system 160.

On the other hand, when the control hardware 400 at the corresponding eNB 120 determines there is no grandmaster eNB $120_{GM}$ in the network 100c within the predetermined period of time (i.e., operation 204 is "No"), then the control hardware designates the eNB 120 as the grandmaster eNB $120_{GM}$ at operation 210. Now acting as the grandmaster eNB $120_{GM}$, the eNB $120_{GM}$ may now transmit PTP packets 182 over the synchronization network 180 to the network switch 162 of the sync-system 160 and determine, at operation 212, whether any other grandmaster eNBs $120_{GM}$ are identified in the network 100c. When the control hardware 400 at the corresponding grandmaster eNB $120_{GM}$ fails to identify another grandmaster eNB $120_{GM}$ (i.e., operation 212 is "No"), the eNB $120_{GM}$ will remain the grandmaster at operation 214, and thereby continue transmitting PTP packets 182 over the synchronization network 180 to the sync-system 160.

However, when the control hardware 400 at the corresponding grandmaster eNB $120_{GM}$ identifies another grandmaster eNB $120_{GM}$ (i.e., operation 212 is "Yes"), the grandmaster eNB $120_{GM}$ ceases transmission of the PTP packets 182 to the sync-system 160 at operation 216 and waits a threshold period of time before the control hardware 400 determines, at operation 218, whether the eNB $120_{GM}$ receives a PTP packet 182 from the other identified grandmaster eNB $120_{GM}$. When the synchronization port 122 associated with the grandmaster eNB $120_{GM}$ receives the PTP packet 182 over the synchronization network 180 from the other identified grandmaster eNB $120_{GM}$ via the network switch 162 of the sync-system 160 (i.e., operation 218 is "Yes"), the grandmaster eNB $120_{GM}$ transitions, at operation 220, to now become a slave eNB $120_S$ while the identified eNB $120_{GM}$ remains the grandmaster. Conversely, when the synchronization port 122 associated with the grandmaster eNB $120_{GM}$ fails to receive the PTP packet 182 from the other identified grandmaster eNB $120_{GM}$ (i.e., operation 218 is "No"), the grandmaster eNB $120_{GM}$ remains the grandmaster eNB $120_{GM}$ at operation 222 and resumes transmitting PTP packets 182 to the sync-system 160.

In some examples, at operation 220, the eNB $120_{GM}$ remains the grandmaster despite receiving the PTP packet 182 from the eNB $120_{GM}$ identified at operation 212, while the eNB $120_{GM}$ identified at operation 212 transitions to now become the slave eNB $120_S$. In yet other examples, at operation 220, the two grandmaster eNBs $120_{GM}$ may determine amongst each other (or negotiate based on XO stability), which eNB 120 will act as the grandmaster and which eNB 120 will act as the slave.

Figure 2B:
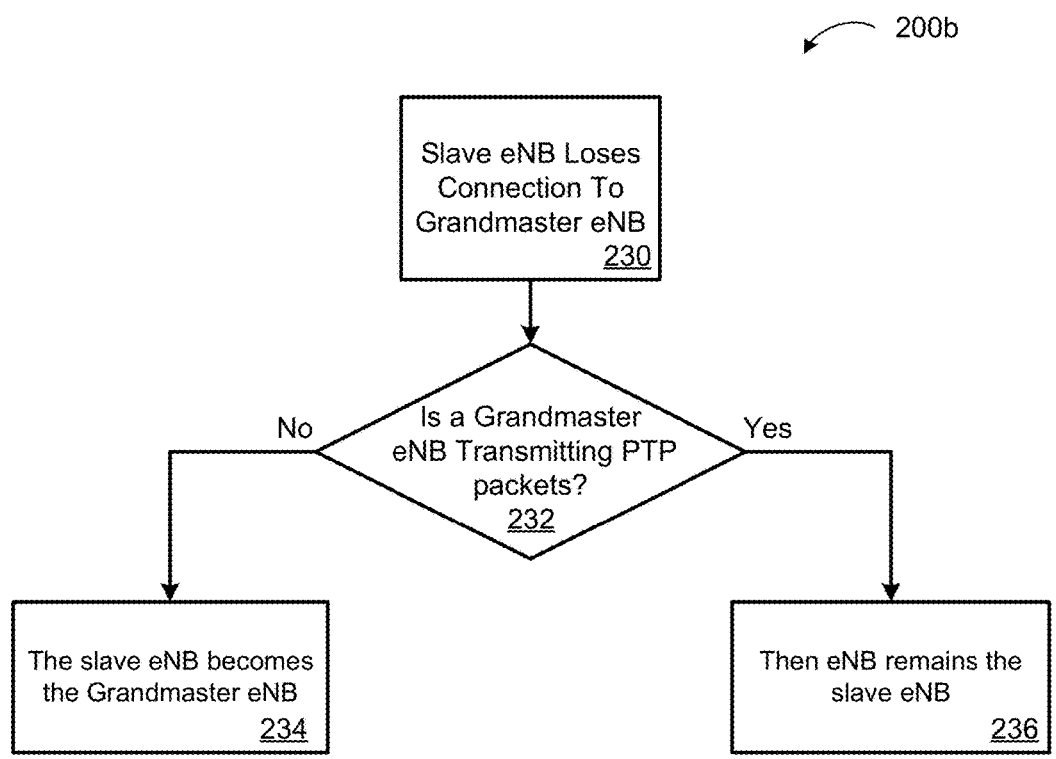
FIG. 2B is a flowchart of an example method for determining a grandmaster eNB when a slave eNB loses connection with a grandmaster eNB of the network of FIG. 1C.

FIG. 2B is a flowchart of an example method 200b for determining a grandmaster eNB 120 after a slave eNB $120_S$ loses connection with a grandmaster eNB $120_{GM}$. Each eNB 120 is associated with the synchronization system 160 of FIG. 1C, and therefore includes a corresponding synchronization port 122 configured to transmit/receive PTP packets 182 from the network switch 162. In some implementations, a slave eNB $120_S$ loses connection with a grandmaster eNB $120_{GM}$ at operation 230. For instance, the slave eNB $120_S$ may stop receiving the PTP packets 182 from the grandmaster eNB $120_{GM}$ via the network switch 162 of the sync-system 160 due to multiple factors, such as but not limited to, the grandmaster eNB $120_{GM}$ powering off or undergoing maintenance. After waiting a predetermined period of time, the control hardware 400 at the corresponding slave eNB $120_S$ determines, at operation 232, whether another grandmaster eNB $120_{GM}$ is transmitting PTP packets 182 over the synchronization network 180 (or the previous grandmaster eNB $120_{GM}$ has resumed transmitting PTP packets 182). For instance, the slave eNB $120_S$ may receive a PTP packet 182 at its synchronization port 122 (e.g., Ethernet port 122a). When the control hardware 400 at the corresponding slave eNB $120_S$ determines another grandmaster eNB $120_{GM}$ is transmitting PTP packets 182 (i.e., operation 232 is "Yes"), then the eNB $120_S$ remains the slave at operation 236. Conversely, when the control hardware 400 at the corresponding slave eNB $120_S$ fails to determine another grandmaster eNB $120_{GM}$ is transmitting PTP packets 182 (i.e., operation 232 is "No"), then the eNB $120_S$ transitions to become the grandmaster eNB $120_{GM}$ at operation 234.

Figure 3:
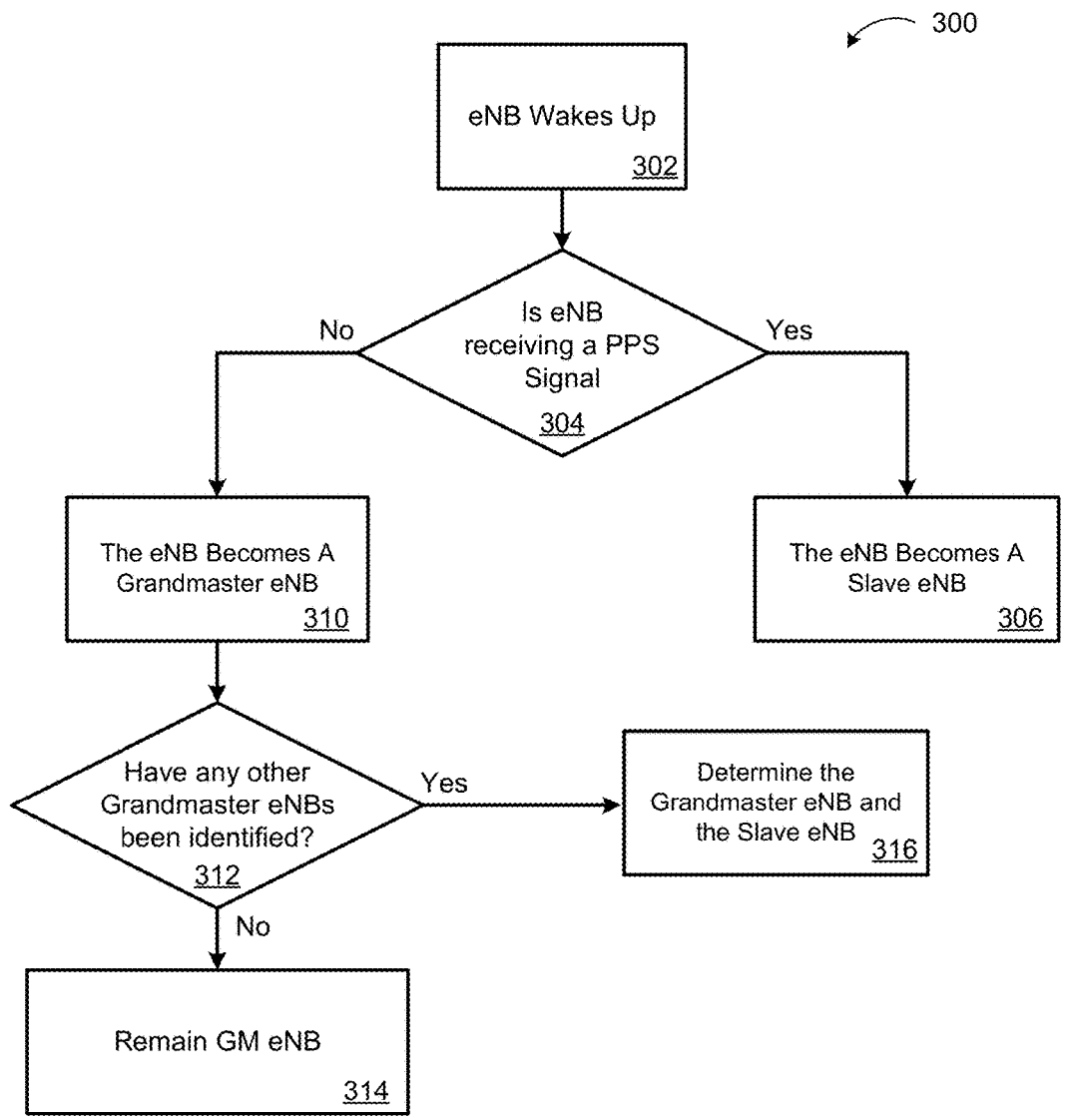
FIG. 3 is a flowchart of an example method for determining a grandmaster eNB from multiple eNBs of the network of FIG. 1D.

FIG. 3 is a flowchart of an example method 300 for determining a grandmaster eNB 120 from multiple eNBs 120 each having a synchronization port 122 (e.g., PSS connector 122b) configured to transmit/receive PPS signals 192 from the PPS splitter 168 of the sync-system 160 of FIG. 1D. The flowchart starts at operation 302 when the eNB 120 of interest wakes up, and within a predetermined time, the corresponding control hardware 400 determines, at operation 304, whether any of the neighboring eNBs 120 in the network 100c are designated as the grandmaster eNB $120_{GM}$. Specifically, the control hardware 400 determines whether the corresponding eNB 120 is receiving a PPS signal 192 at the associated PPS connector 122b within the predetermined time. When the control hardware 400 at the corresponding eNB 120 determines there is a grandmaster eNB $120_{GM}$ in the network 100d within the predetermined period of time (i.e., operation 304 is "Yes"), then the eNB 120 becomes one of the slave eNBs $120_S$ at operation 306 and receives PSS signals 192 from the designated grandmaster eNB $120_{GM}$ via the PSS splitter 168 of the sync-system 160. The PPS connectors 122b associated with each of the eNBs 120 of the network 100d of FIG. 1D may transmit information in addition to the PPS signal 192 to resolve conflict between the eNBs for designating which eNB 120 will be the grandmaster and designating which eNB(s) 120 will be the slaves.

On the other hand, when the control hardware 400 at the corresponding eNB 120 determines there is no grandmaster eNB $120_{GM}$ in the network 100d within the predetermined period of time (i.e., operation 304 is "No"), then the eNB 120 becomes the grandmaster eNB $120_{GM}$ at operation 310. Now acting as the grandmaster eNB $120_{GM}$, the eNB $120_{GM}$ may now transmit PPS signals 192 to the PPS splitter 168 of the sync-system 160 and the control hardware 400 may determine, at operation 312, whether any other grandmaster eNBs $120_{GM}$ are identified in the network 100d. When the control hardware 400 at the corresponding grandmaster eNB $120_{GM}$ fails to identify another grandmaster eNB $120_{GM}$ (i.e., operation 312 is "No"), the eNB $120_{GM}$ will remain the grandmaster at operation 314, and thereby continue transmitting PPS signals 192 to the sync-system 160. The control hardware 400 may fail to identify another grandmaster eNB 120$_{GM}$ when the corresponding PSS connector 122b fails to receive PSS signals 192.

However, when the control hardware 400 at the corresponding grandmaster eNB 120$_{GM}$ identifies another grandmaster eNB 120$_{GM}$ (i.e., operation 312 is "Yes"), the two grandmaster eNBs 120$_{GM}$ communicate amongst each other to determine which eNB 120 will remain the grandmaster and which eNB 120 will transition to become the slave. Thus, the two grandmaster eNBs 120$_{GM}$ may resolve the conflict by communicating with one another. In some examples, the two grandmaster eNBs 120 may communicate via an Operation, Administration, and Maintenance (OAM) link over the S1 interface 126 (e.g., backhaul link) to resolve which eNB will remain the grandmaster eNB 120$_{GM}$ and which eNB will transition to become the slave eNB 120$_S$. Moreover, the OMC 190 at the EPC 104 may select the grandmaster eNB 120$_{GM}$ and the slave eNB 120$_S$ based on one or more factors, such as, but not limited to, eNB capability, crystal oscillator (XO) stability, and GPS signal availability at the eNBs 120.

In some implementations, two grandmaster eNBs 120$_{GM}$ transmit a PPS signal 192 at nearly the same time, thereby making it difficult to detect that two grandmaster eNBs 120 are using the sync-system network 180 at nearly the same moment. Under this scenario, each grandmaster eNB 120$_{GM}$ randomly transmits a double-length identification sequence to the sync-system 160. If there are two grandmaster eNBs 120$_{GM}$ with nearly the same timing and one transmits a double length sequence, the other grandmaster eNB 120$_{GM}$ may transmit a normal length sequence and be able to detect the other grandmaster eNBs 120$_{GM}$ transmitting the double length sequence.

Figure 4:
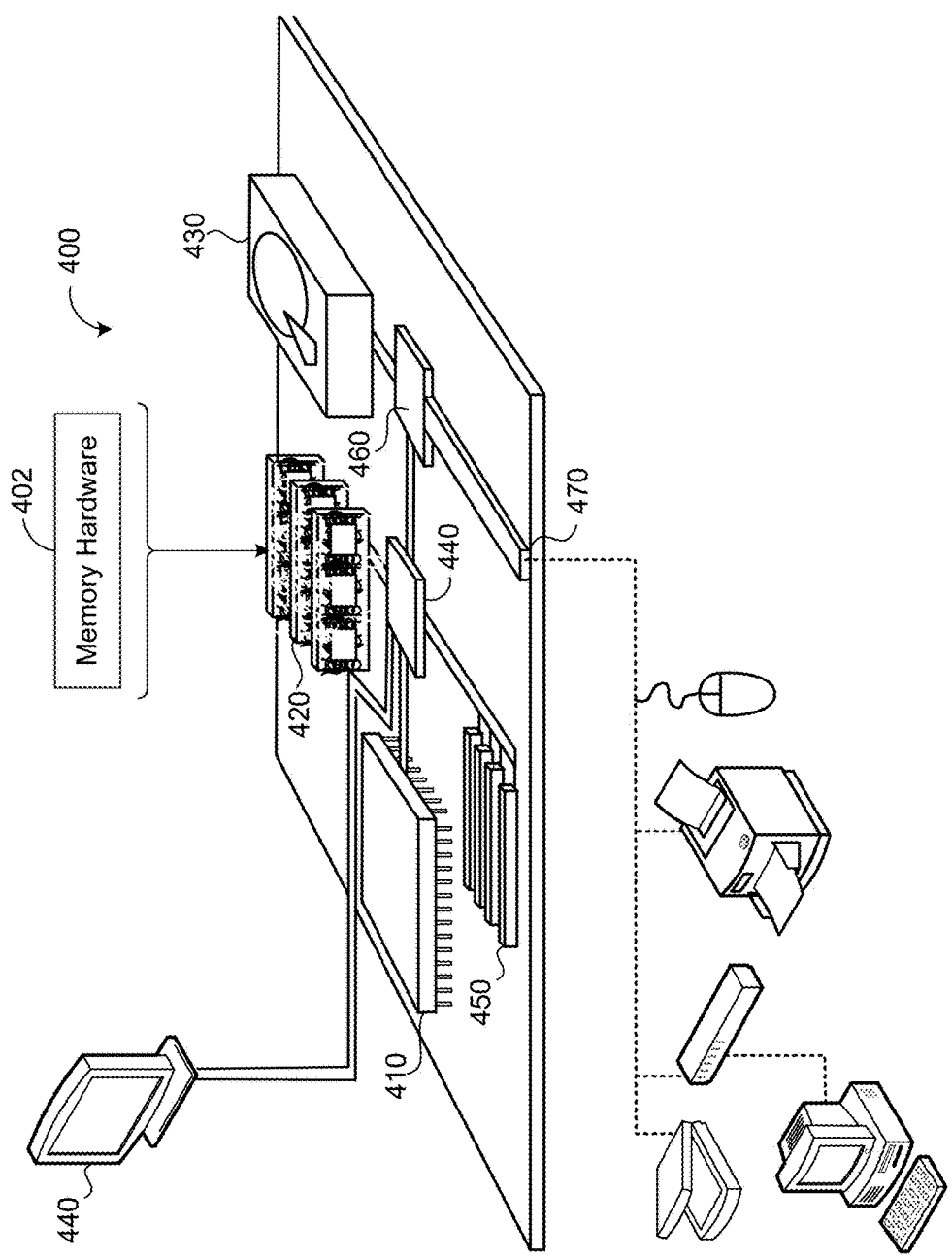
FIG. 4 is a schematic view of example control hardware.

FIG. 4 is a schematic view of an example of the control hardware 400 that may be used to implement the systems and methods described in this document. The control hardware 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The control hardware 400 includes a processor 410, memory 420, a storage device 430, a high-speed interface/controller 440 connecting to the memory 420 and high-speed expansion ports 450, and a low speed interface/controller 460 connecting to a low speed bus 470 and storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a GUI on an external input/output device, such as a display 440 coupled to a high speed interface 440. In other implementations, multiple processors and/or multiple buses may be used, as appropriate, along with multiple memories and types of memory. Also, multiple control hardware devices 400 may be connected, with each device providing portions of the necessary operations (e.g., as a server bank, a group of blade servers, or a multi-processor system).

The memory 420 includes hardware that stores information non-transitorily within the control hardware 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the control hardware 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), phase change memory (PCM).

The storage device 430 is capable of providing mass storage for the control hardware 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 440 (e.g., through a graphics processor or accelerator), and to the high-speed expansion ports 450, which may accept various expansion cards (not shown). In some implementations, the low-speed controller 460 is coupled to the storage device 430 and low-speed expansion port 470. The low-speed expansion port 470, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The control hardware 400 may be implemented in a number of different forms, as shown in the figure. For example, it may be implemented as a standard server or multiple times in a group of such servers, as a laptop computer, or as part of a rack server system. In other implementations, the control hardware includes a field programmable gate array (FGPA), a digital signal processor (DSP), or any other suitable circuitry. In some implementations, the control hardware 400 is in communication with memory hardware 402 (e.g., in the memory 420).

A software application (i.e., a software resource 110$_S$) may refer to computer software that causes a computing device to perform a task. In some examples, a software application may be referred to as an "application," an "app," or a "program." Example applications include, but are not limited to, mobile applications, system diagnostic applications, system management applications, system maintenance applications, word processing applications, spreadsheet applications, messaging applications, media streaming applications, social networking applications, and gaming applications.

The memory hardware 110*hm* may be physical devices used to store programs (e.g., sequences of instructions) or data (e.g., program state information) on a temporary or permanent basis for use by a computing device 110*hc*. The non-transitory memory 110*hm* may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A telecommunication system comprising:
    base stations configured to transmit/receive signals to/from user equipment;
    a backhaul network in communication with the base stations and configured to convey information to and from at least one of the base stations;
    a synchronizing system in communication with the base stations and configured to synchronize a communication timing between the base stations over a synchronizing network, the synchronizing network is separate from the backhaul network and is configured to provide the communication timing between the synchronizing system and a corresponding synchronization port at each of the base stations, the synchronizing system comprising one of a network switch or a pulse-per-second splitter in communication with the synchronization ports at each of the base stations,
    wherein, when the synchronizing system comprises the pulse-per-second splitter, a first base station designated as a first grandmaster base station after waking up is configured to:
        transmit the communication timing from the synchronization port at the first base station to the synchronizing system over the synchronizing network;
        after transmitting the communication timing from the synchronization port at the first base station, identify a second base station in the communication network as a second grandmaster base station by detecting a double-length identification sequence transmitted from the second base station to the synchronizing system over the synchronizing network; and
        resolve with the second base station identified as the second grandmaster base station over a backhaul link whether one of:
            the first base station will remain the first grandmaster base station and the second base station will transition to become a slave base station; or
            the first base station will transition to become the slave base station and the second base station will remain the second grandmaster base station.

2. The telecommunication system of claim 1, wherein when the synchronizing system comprises the network switch, the synchronizing system comprises:
    a global positioning system; and
    a grandmaster clock in communication with the global positioning system and configured to receive a current time from the global positioning system,
    wherein the network switch is in communication with the grandmaster clock and configured to receive the communication timing from the grandmaster clock and transmit the communication timing to the base stations over the synchronizing network.

3. The telecommunication system of claim 2, wherein the synchronization port at each base station comprises an Ethernet port configured to receive a precision time protocol signal from the network switch.

4. The telecommunication system of claim 2, wherein the network switch is configured to transmit a precision time protocol signal to the base stations over the synchronizing network, the precision time protocol signal comprising the communication timing.

5. The telecommunication system of claim 1, wherein when the synchronizing system comprises the pulse-per-second splitter, the synchronizing system comprises:
   a global positioning system; and
   a grandmaster clock in communication with the global positioning system and configured to receive a current time from the global positioning system,
   wherein the pulse-per-second splitter is in communication with the grandmaster clock and configured to receive the communication timing from the grandmaster clock and transmit the communication timing to the base stations over the synchronizing network.

6. The telecommunication system of claim 5, wherein the synchronization port at each base station comprises a pulse-per-second port configured to receive a pulse-per-second signal from the pulse-per-second splitter.

7. The telecommunication system of claim 5, wherein the pulse-per-second splitter is configured to transmit a pulse-per-second signal to the base stations, the pulse-per-second signal comprising the communication timing.

8. The telecommunication system of claim 1, wherein when the synchronizing system comprises the network switch, the network switch is configured to:
   receive the communication timing transmitted from the first base station designated as the first grandmaster base station; and
   transmit the communication timing to the base stations other than the first grandmaster base station.

9. The telecommunication system of claim 8, wherein the synchronization port at each base station comprises an Ethernet port configured to:
   receive a precision time protocol signal from the network switch; or
   transmit the precision time protocol signal to the network switch.

10. The telecommunication system of claim 8, wherein the network switch is configured to:
    receive a precision time protocol signal from the first grandmaster base station, the precision time protocol signal comprising the communication timing; and
    transmit the precision time protocol signal to the base stations other than the first grandmaster base station.

11. The telecommunication system of claim 1, wherein when the synchronizing system comprises the pulse-per-second splitter in communication with the synchronization ports at each of the base stations, the pulse-per-second splitter configured to:
    receive the communication timing transmitted from the first base station designated as the first grandmaster base station; and
    transmit the communication timing to the base stations other than the first grandmaster base station.

12. The telecommunication system of claim 11, wherein the synchronization port at each base station comprises a pulse-per-second port configured to:
    receive a pulse-per-second signal from the pulse-per-second splitter; or
    transmit the pulse-per-second signal to the pulse-per-second splitter.

13. The telecommunication system of claim 11, wherein the pulse-per-second splitter is configured to:
    receive a pulse-per-second signal from the first grandmaster base station, the pulse-per-second signal comprising the communication timing; and
    transmit the pulse-per-second signal to the base stations other than the first grandmaster base station.

14. A method comprising:
    receiving, at a first base station, information over a backhaul network, the first base station comprising one of multiple base stations in a telecommunication network;
    transmitting communication signals from the first base station to user equipment over an air interface;
    receiving, at the first base station, a communication timing from a synchronizing system over a synchronizing network, the synchronizing system in communication with the base stations and configured to synchronize the communication timing between the base stations over the synchronizing network, the synchronizing network is separate from the backhaul network and is configured to provide the communication timing between the synchronizing system and a corresponding synchronization port at each of the base stations;
    when a second base station initially wakes up, determining, by control hardware of the second base station, whether any of the other base stations in the communication network are identified as a first grandmaster base station within a predetermined period of time;
    when the control hardware fails to identify one of the other base stations as the first grandmaster base station within the predetermined period of time:
       designating, by the control hardware, the second base station as the first grandmaster base station;
       transmitting the communication timing from the synchronization port at the second base station to the synchronizing system over the synchronizing network;
       after transmitting the communication timing from the synchronization port at the second base station, identifying, by the control hardware, one of the other base stations in the communication network as a second grandmaster base station by detecting a double-length identification sequence transmitted from the other base station to the synchronizing system over the synchronizing network; and
       resolving, by the control hardware, with the other base station identified as the second grandmaster base station over a backhaul link whether one of:
          the second base station will remain the first grandmaster base station and the other base station will transition to become a slave base station; or
          the second base station will transition to become the slave base station and the other base station will remain the second grandmaster base station.

15. The method of claim 14, wherein the synchronizing system comprises:
    a global positioning system;
    a grandmaster clock in communication with the global positioning system and configured to receive a current time from the global positioning system; and
    a network switch in communication with the grandmaster clock and the first base station, the network switch configured to receive the communication timing from the grandmaster clock and transmit the communication timing to the first base station over the synchronizing network.

16. The method of claim 15, wherein receiving the communication timing from the synchronizing system comprises receiving, at the synchronization port at the first base station, a precision time protocol signal from the network switch, the synchronization port comprising an Ethernet port.

17. The method of claim 14, wherein the synchronizing system comprises:
   a global positioning system;
   a grandmaster clock in communication with the global positioning system and configured to receive a current time from the global positioning system; and
   a pulse-per-second splitter in communication with the grandmaster clock and the transmitters, the pulse-per-second splitter configured to receive the communication timing from the grandmaster clock and transmit the communication timing to the base stations over the synchronizing network.

18. The method of claim 17, wherein receiving the communication timing from the synchronizing system comprises receiving, at the synchronization port at the first base station, a pulse-per-second signal from the pulse-per-second splitter, the synchronization port comprising a pulse-per-second port.

19. The method of claim 14, further comprising:
   when one of the other base stations is identified as the first grandmaster base station within the predetermined period of time:
      designating, by the control hardware, the second base station as a slave base station; and
      receiving, at the synchronization port of the second base station, the communication timing from the synchronizing system over the synchronizing network.

20. The method of claim 19, wherein determining whether any of the other base stations in the communication network are identified as the first grandmaster base station comprises determining one of the other base stations is identified as the first grandmaster base station when the synchronization port at the second base station receives a precision time protocol signal from a network switch over the synchronizing network, the precision time protocol signal comprising the communication timing.

21. The method of claim 20, wherein the network switch is configured to:
   receive the precision time protocol signal from the other base station comprising the first grandmaster base station; and
   transmit the precision time protocol signal to the second base station.

22. The method of claim 19, wherein determining whether any of the other base stations in the communication network are identified as the first grandmaster base station comprises determining one of the other base stations is identified as the first grandmaster base station when the synchronization port at the second base station receives a pulse-per-second signal from a pulse-per-second splitter over the synchronizing network, the pulse-per-second signal comprising the communication timing.

23. The method of claim 22, wherein the pulse-per-second splitter is configured to:
   receive the pulse-per-second signal from the other base station comprising the first grandmaster base station; and
   transmit the pulse-per-second signal to the second base station.

24. The method of claim 14, wherein the resolving with the other base station is based a crystal oscillator stability at each of the base stations.

25. The method of claim 14, wherein the resolving with the other base station is based on global positioning system signal availability at each of the base stations.

* * * * *